3,329,733
UNSATURATED HYDROCARBON DEHYDROGEN-
  ATION WITH CARBON DIOXIDE ACTIVATED
  METAL OXIDE CATALYST
Thomas M. O'Grady, Chicago Heights, Ill., assignor to
  Standard Oil Company, Chicago, Ill., a corporation of
  Indiana
No Drawing. Filed Aug. 19, 1964, Ser. No. 390,720
           15 Claims. (Cl. 260—669)

This invention relates to an improved process for the dehydrogenation of unsaturated hydrocarbons and to an improved dehydrogenation catalyst, more particularly, to a regenerated novel metal oxide catalyst.

In catalytic dehydrogenation the solid dehydrogenation catalysts lose their effectiveness because carbonaceous material assembles on their catalytically active sites. The traditional way to regenerate the spent catalyst was to burn off this carbonaceous material with oxygen. In so doing, the whole catalyst is reactivated. But in activation of the whole catalyst the catalytic sites for many side reactions are also activated reducing the product selectivity and increasing undesirable side reactions. This results in lower yield and consequently lower commercial value of the process.

To overcome this difficulty it has been discovered that when dehydrogenation catalysts disclosed in United States patent application Ser. No. 303,676, filed Aug. 21, 1963, now U.S. Patent No. 3,288,453, consisting of oxides of three different classes of metals, low melting metals of Periodic Group II–B having an atomic weight of from about 65 to about 113, e.g., zinc or cadmium, an alkaline earth metal, for example, calcium, magnesium or barium and aluminum, are regenerated in carbon dioxide atmosphere the product selectivity of the resulting catalyst is greatly increased. This carbon dioxide activation of the dehydrogenation catalysts was completely unexpected. The regenerated catalyst was rendered more useful for commercial dehydrogenation than it had been heretofore. The unique aspect of this regeneration is that the selectivity of the regenerated catalyst exceeds that of the freshly prepared catalyst in unsaturated hydrocarbon dehydrogenation. In essence, a novel regenerated dehydrogenation catalyst is produced when a catalyst composition comprising the three metal oxides disclosed above, deactivated in the dehydrogenation of unsaturated hydrocarbons, is subjected to carbon dioxide regeneration at 1070 to 1300° F. This catalyst has different surface properties than those of the fresh or oxygen regenerated catalysts. The carbon dioxide regeneration is a selective regeneration and apparently the active dehydrogenation sites of the catalyst are restored while the isomerization-cracking sites remain blocked. This phenomenon can be readily observed when for example isoamylenes are dehydrogenated to isoprene. Initial conversion for a fresh aluminum, zinc oxide, magnesium oxide catalyst is about 40% but as the dehydrogenation proceeds the conversion declines while the selectivity increases. The same phenomenon is observed with the oxygen regenerated catalyst. This catalyst behaves similarly to the fresh catalyst. Here high conversion but low selectivity is observed at the beginning of the reaction, the selectivity improves as the isomerization-cracking sites become blocked. The carbon dioxide regenerated catalyst on the other hand has a high selectivity at the beginning of the run and retains this selectivity continuously even when the conversion goes down to ten percent. The physical properties of the carbon dioxide regenerated catalyst are distinct from both the fresh and the oxygen regenerated catalyst. In the dehydrogenation of unsaturated hydrocarbons the carbon dioxide regenerated catalyst exhibits unique properties in that it does not change the percent selectivity from the beginning to the end of a dehydrogenation process while the conversion goes down from 40 to 10 percent. With the fresh and oxygen regenerated catalyst the selectivity is low, about 70–75 percent, at the beginning of the run while the percent conversion is high. The capacity to retain a high selectivity is also impaired in the freshly prepared and oxygen regenerated catalyst. The different surface properties and the unique catalytic behavior of the carbon dioxide regenerated catalyst indicates that a novel dehydrogenation catalyst has been prepared by the carbon dioxide treatment at the temperatures above 1000° F. of the metal oxide catalyst disclosed above.

This new carbon dioxide regenerated catalyst composition comprises the oxides of three different classes of metals as disclosed above but the proportion of oxides of alkaline earth metal and metal oxide can vary over a wide range with respect to alumina but must be at unity with respect to each other. Thus in a component weight ratio based on ten (10) parts $Al_2O_3$ the range of low melting metal oxide and alkaline earth metal oxide can be 0.1 to 5 weight parts. Desirable catalyst compositions are those in which the alkaline earth metal oxides are oxides of magnesium, calcium, or barium. The catalyst compositions containing oxides of calcium or barium are capable of producing substantially the same conversions as those containing magnesium oxide but with respect to selectivity the calcium or barium oxide containing catalysts demonstrate a lower selectivity level with respect to the desired conversion product than the magnesium oxide containing catalysts. Thus a class, the carbon dioxide regenerated metal-$MgO-Al_2O_3$ catalyst, is preferred. Of this preferred class of catalysts, those containing oxides of zinc are preferred over those containing oxides of cadmium.

In carrying out this invention the said monoolefin hydrocarbon is contacted at above 750° F. with a solid dehydrogenation catalyst which has been regenerated with carbon dioxide at 1070 to 1300° F. The contact temperature must not exceed the temperature at which the unsaturated hydrocarbons undergo thermal decomposition. The desirable operation range is 760 to 1200° F. and the preferred range is 930 to 1110° F. The dehydrogenation can be carried out with the aforementioned combination of oxides of three different metals in a fixed bed of granular catalyst, a moving catalyst bed or a fluidized catalyst bed. By using the fluidized catalyst bed system the heat expended in the endothermic hydrogenation process can be minimized since the carbon dioxide regenerated catalyst being hot (over 1000° F.) can serve as a source of heat for the dehydrogenation.

The carbon dioxide regenerated catalyst of this invention is useful in dehydrogenations of monoolefins to conjugated dienes and dehydrogenating other unsaturated hydrocarbons to more useful compounds. In these dehydrogenations the product selectivity is greatly improved over commercially available catalysts for the dehydrogenation of unsaturated hydrocarbons. It has been shown that in the dehydrogenation of isoamylenes to isoprene the percent selectivity for the carbon dioxide regenerated catalyst is 75% while for the commercially available catalysts it is between 40 and 45%. When we compare the oxygen regenerated catalyst with the carbon dioxide regenerated catalyst in the dehydrogenation of 2-methylbutene-2 to isoprene, we note that the product selectivity for the carbon dioxide regenerated catalyst is 92% while for the oxygen regenerated catalyst it is 80.4%. We note that when the carbon dioxide regenerated catalyst is used there are minimal side reactions while in the oxygen regenerated catalysts there are significant amounts of $C_2$ to $C_5$ hydrocarbons other than isoprene or isoamylene. This further indicates that the isomerization and cracking sites remain blocked in the carbon dioxide regenerated catalysts.

The carbon dioxide regenerated catalyst is not useful in dehydrogenating alkanes and methyl substituted aromatic. This resistance to dehydrogenation makes these compounds excellent heat diluents and heat carriers. Benzene, toluene, and xylene are particularly useful in keeping down the amount of thermal energy which has to be expended in the endothermic process. Benzene is the preferred diluent and heat carrier because of its high heat capacity but gases inert to the reactants for example nitrogen and argon are also effective diluents. Steam is a satisfactory diluent in dehydrogenations where lower conversion can be tolerated without reducing the high selectivity.

In the dehydrogenation process the temperature and feed rates are the same for the oxygen regenerated catalysts. Thus, suitable operating conditions can be achieved where the feed stock is introduced in the range of about 1 to 8 volumes of feed per volume of catalyst in the temperature 760° F. to 1200° F., the preferred range being about 1 to 5 volumes of feed per volume of catalyst at 950 to 1100° F.

The novel process of this invention can be effectively employed in the fluidized catalyst system where the metal oxide catalyst system consisting of the oxide of one metal of each class of metals comprising (a) low melting metals having an atomic weight of from 65 to about 113 and (b) alkaline earth metals and alumina, deactivated in the dehydrogenation of unsaturated hydrocarbons is regenerated with carbon dioxide at 1070 to 1300° F. while the dehydrogenation is continued with a fresh catalyst which when deactivated is replaced by the regenerated catalyst. In this process the heat expended in the endothermic dehydrogenation is reduced since once the dehydrogenation cycle is started it is supplied continuously with a hot (1000–1300° F.) regenerated catalyst.

The following examples are included as illustrations of the preparation of the catalyst and reaction products of this invention and are not intended as limitations thereof.

*Example 1*

The solid catalyst containing three different metal oxides in the weight ratio of about 20 weight parts zinc oxide, 20 weight parts magnesium oxide, and 60 weight parts alumina was regenerated with carbon dioxide in a catalytic conversion tube at 1200° F. The carbon dioxide was charged through the catalyst tube at the rate of 500 cc. per minute for five hours. The effectiveness of this catalyst in increasing product selectivity was compared to commercially available catalysts. Thus a mixture of nitrogen and isoamylenes equivalent to a 5 to 1 dilution was contacted with the solid catalyst maintained at 1070 to 1100° F. The feed stock was introduced to provide isoamylene to catalyst ratio of 5 liquid volumes of isoamylene per volume of catalyst per hour. In this run the effectiveness of the solid $CO_2$ regenerated catalyst was compared to a commercially available Houdry catalyst. The results are summarized in the following table.

TABLE 1

|  | $CO_2$ Regenerated Catalyst | Commercial 1 (Houdry) |
|---|---|---|
| Over-all selectivity (wt. percent isoprene) | 75 | 40–45 |

Thus it can be observed that the over-all selectivity of the carbon dioxide regenerated catalyst is much greater than that obtained with a standard commercial catalyst.

*Example 2*

The effectiveness of the $CO_2$ regenerated solid catalyst of Example 1 was compared to the oxygen, carbon dioxide regenerated catalyst. The regeneration of the solid catalyst was carried out at 850° F. to 1020° F. in a catalyst conversion tube wherein a mixture of 5 volume percent $O_2$ in $CO_2$ was passed over the catalyst at a rate of 500 ccs. per minute. The comparative product distribution is given in the following table:

TABLE 2.—COMPARATIVE PRODUCT DISTRIBUTIONS

|  | $C_2$–$C_3$ | Piperylene | C.P.* | Isoamylene | Isoprene | Selectivity |
|---|---|---|---|---|---|---|
| $CO_2$ Regeneration (percent) | 2.5 | 0.5 | 0.1 | 61.3 | 35.6 | 92.0 |
| $O_2/CO_2$ Regeneration (percent) | 5.4 | 3.4 | 0.4 | 52.3 | 38.5 | 80.4 |

* Cyclopentadiene.

This shows shows that the optium catalyst activation is achieved when the catalyst regeneration is conducted in a complete carbon dioxide atmosphere. In the same example it was shown that a product selectivity remains over 91% with a $CO_2$ regenerated catalyst while the selectivity of the oxygen regenerated catalyst was slower to reach a comparatively high selectivity and deteriorated more rapidly. The following table shows a weight percent product selectivity compared to the percent conversion of isoamylenes to isoprene. Table 3 gives the product selectivity in weight percent at various conversions.

TABLE 3.—COMPARATIVE SELECTIVITIES AT VARIOUS CONVERSIONS

|  | Percent Conversion | | | | | | | | | | | |
|---|---|---|---|---|---|---|---|---|---|---|---|---|
|  | 40.0 | 37.5 | 35.0 | 32.5 | 30.0 | 27.5 | 25.0 | 22.5 | 20.0 | 17.5 | 15.0 | 12.5 | 10.0 |
| Percent Selectivity (wt. percent) with $CO_2$ Regenerated Catalyst | 91.6 | 91.8 | 92.6 | 92.3 | 92.4 | 92.3 | 92.5 | 92.5 | 92.5 | 92.5 | 92.3 | 92.0 | 91.3 |
| Percent Selectivity (wt. percent) with Oxygen Regenerated Catalyst | 74.0 | 80.8 | 85.3 | 88.8 | 90.8 | 92.0 | 92.5 | 92.3 | 91.8 | 91.0 | 90.0 | 88.3 | 85.8 |

Table 3 illustrates the observation that the oxygen regenerated catalyst does not effect high selectivities until the activated isomerization and cracking sites are blocked by carbonaceous material. The capacity to retain the high selectivity is also impaired in the oxygen regenerated catalyst.

*Example 3*

In a process for the conversion of cumene to alpha methyl styrene a mixture of nitrogen and cumene equivalent to a 5 to 1 dilution was contacted with the carbon dioxide regenerated solid catalyst containing three different metal oxides in the ratio of about 20 weight parts zinc oxide, 20 weight parts magnesium oxide, and 60 weight parts alumina at 980–1022° F. The carbon dioxide regeneration of the catalyst was conducted as disclosed in Example 1. The selectivity in this process is 98% at 70% conversion.

Example 4

In the same manner as disclosed in Example 3 when ethylbenzene is substituted for cumene, styrene may be obtained at selectivities in excess of 95% and at conversions of 70% and better.

Example 5

In the same manner as disclosed in Example 1 benzene is prepared when hexene is substituted for isoamylenes.

What is claimed is:

1. A regenerated dehydrogenation catalyst composition prepared by the carbon dioxide regeneration of a deactivated metal oxide catalyst composition consisting of an oxide of one metal of each class of metals consisting of (a) cadmium and zinc, (b) alkaline earth metals, and (c) aluminum, wherein said catalyst has been regenerated in a carbon dioxide atmosphere in the temperature range of from 1070 to 1300° F.

2. A regenerated dehydrogenation catalyst composition of claim 1 wherein the regeneration has been carried out at 1110 to 1200° F.

3. The catalyst composition of claim 1 wherein the catalyst is a combination of alumina, zinc oxide, and magnesium oxide.

4. A process for regenerating a deactivated dehydrogenation catalyst composition consisting of an oxide of one metal of each class of metals consisting of (a) cadmium and zinc, (b) alkaline earth metals, and (c) aluminum, which comprises heating the catalyst with carbon dioxide at 1070 to 1300° F.

5. The process of claim 4 wherein the alkaline earth metal oxide is magnesium oxide.

6. The process of claim 4 wherein the catalyst consists of a combination of alumina, zinc oxide, and magnesium oxide.

7. An improved process for the conversion of unsaturated hydrocarbon feed to more unsaturated hydrocarbons by contacting in the catalytic conversion zone said unsaturated hydrocarbon at a temperature of about 760 to about 1200° F. with a regenerated metal oxide catalyst consisting of alumina and one each of an alkaline earth metal oxide and an oxide of a metal selected from the group consisting of cadmium and zinc, which catalyst has been regenerated by contacting a deactivated catalyst of the aforesaid composition with carbon dioxide at a temperature in the range of about 1070 to 1300° F. whereby higher dehydrogenation product selectivity is obtained than with an oxygen regenerated catalyst.

8. A method of dehydrogenating a mono olefin hydrocarbon feed having only 4 to 5 chain carbon atoms to the corresponding diene hydrocarbon without substantial skeletal rearrangement which comprises contacting in a catalytic conversion zone said mono olefin hydrocarbon at the temperature of about 760 to about 1200° F. with a regenerated metal oxide catalyst which consists of an alumina and one each of an alkaline earth metal oxide an oxide of a metal selected from the group consisting of cadmium and zinc, each in the range of from 0.1 to 10 weight parts for each 10 parts of alumina, wherein the deactivated metal oxide catalyst has been regenerated with carbon dioxide at a temperature of about 1070 to 1300° F.

9. A method of preparing isoprene comprising contacting 2-methylbutene-2 in a catalytic conversion zone at the temperature of 932 to 1110° F. with a regenerated metal oxide catalyst which consists of alumina and one each of an alkaline earth metal oxide and an oxide of a metal selected from the group consisting of cadmium and zinc, each in the range of from 0.1 to 5 weight parts for each 10 parts of alumina, wherein the deactivated metal oxide catalyst has been regenerated with carbon dioxide at a temperature of about 1070 to 1300° F.

10. A method of preparing a vinyl substituted aromatic hydrocarbon comprising contacting an aromatic hydrocarbon having at least one alkyl hydrocarbon substituent of only two to three carbon atoms in its hydrocarbon chain in a catalytic conversion zone at a temperature of about 760 to about 1200° F. with a regenerated metal oxide catalyst which consists of alumina and one each of an alkaline earth metal oxide and an oxide of a metal selected from the group consisting of cadmium and zinc, each in the range of from 0.1 to 10 weight parts for each 10 parts of alumina, wherein the deactivated metal oxide catalyst has been regenerated with carbon dioxide at a temperature of about 1070 to 1300° F.

11. The method of claim 10 wherein the vinyl substituted aromatic hydrocarbon prepared is alpha-methyl styrene and wherein the aromatic hydrocarbon having at least one alkyl hydrocarbon substituent is ethyl benzene.

12. The method of claim 10 wherein the vinyl substituted aromatic hydrocarbon prepared is styrene and wherein the aromatic hydrocarbon having at least one alkyl hydrocarbon substituent is cumene.

13. A method of preparing aromatic hydrocarbons comprising contacting at a temperature of about 760 to about 1200° F. in a catalytic conversion zone a hydrocarbon having a mono olefin chain only from 4 to 6 chain carbon atoms in length and a total of 6 to 20 carbon atoms with a regenerated metal oxide catalyst which consists of alumina and one each of an alkaline earth metal oxide and an oxide of a metal selected from the group consisting of cadmium and zinc, each in the range of from 0.1 to 5 weight parts for each 10 parts of alumina, wherein the deactivated catalyst has been regenerated with carbon dioxide at a temperature of about 1070 to 1300° F.

14. The method of claim 13 wherein the hydrocarbon having a mono olefin chain only from 4 to 6 chain carbon atoms in length is n-hexene.

15. The method of claim 4 wherein the catalyst consists of a combination of alumina, an alkaline earth metal oxide and zinc oxide.

References Cited

UNITED STATES PATENTS

| | | | |
|---|---|---|---|
| 2,342,856 | 2/1944 | Hall | 252—416 X |
| 2,416,003 | 2/1947 | Guyer | 252—416 X |
| 2,608,594 | 8/1952 | Robinson | 260—669 X |
| 2,758,098 | 8/1956 | Haensel | 252—416 |
| 2,941,016 | 6/1960 | Schmetterling et al. | 260—673.5 |

DELBERT E. GANTZ, *Primary Examiner.*

C. R. DAVIS, *Assistant Examiner.*